United States Patent
McKinley et al.

(10) Patent No.: US 12,506,767 B2
(45) Date of Patent: Dec. 23, 2025

(54) CYBERSECURITY THREAT MANAGEMENT USING ELEMENT MAPPING

(71) Applicant: Arctic Wolf Networks, Inc., Eden Prairie, MN (US)

(72) Inventors: David B McKinley, Dartmouth, MA (US); Romans Bermans, Cadiz (ES); Joshua McCarthy, Morgan Hill, CA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 776 days.

(21) Appl. No.: 17/825,024

(22) Filed: May 26, 2022

(65) Prior Publication Data
US 2022/0385687 A1 Dec. 1, 2022

Related U.S. Application Data

(60) Provisional application No. 63/327,853, filed on Apr. 6, 2022, provisional application No. 63/297,273, filed
(Continued)

(51) Int. Cl.
*H04L 9/40* (2022.01)
*G06F 21/57* (2013.01)

(52) U.S. Cl.
CPC ........ *H04L 63/1441* (2013.01); *G06F 21/577* (2013.01); *H04L 63/1433* (2013.01); *G06F 2221/034* (2013.01)

(58) Field of Classification Search
CPC ............. H04L 63/1441; H04L 63/1433; H04L 63/145; H04L 63/1483; G06F 21/577; G06F 2221/034
See application file for complete search history.

(56) References Cited

U.S. PATENT DOCUMENTS

| 10,534,971 B2 | 1/2020 | Huber, Jr. et al. |
| 10,621,172 B2 | 4/2020 | Azaria et al. |

(Continued)

FOREIGN PATENT DOCUMENTS

| GB | 2594248 A | * 10/2021 | ........... G06F 21/577 |
| KR | 10-2020-0083874 A | 7/2020 | |

OTHER PUBLICATIONS

Sangani, Nilaykumar Kiran, and Haroot Zarger. "Machine learning in application security." Advances in Security in Computing and Communications. IntechOpen, 2017.
(Continued)

*Primary Examiner* — Thomas A Gyorfi
(74) *Attorney, Agent, or Firm* — Barnes & Thornburg LLP

(57) ABSTRACT

Disclosed techniques include cybersecurity threat management using element mapping. A plurality of cybersecurity threat protection applications is accessed. The cybersecurity threat protection applications include at least two different data management schemas. A first mapping of each of the plurality of cybersecurity threat protection applications is integrated. The first mapping includes a transformation of outputs of each of the plurality of cybersecurity threat protection applications. A second mapping of each of the plurality of cybersecurity threat protection applications is integrated. The second mapping includes a transformation of inputs of each of the plurality of cybersecurity threat protection applications. Cybersecurity is managed for a data network, based on data collected through the first mapping and data transmitted through the second mapping. The integrating a first mapping and a second mapping comprises a universal data layer for cybersecurity management. The universal data layer enables automation workflows for the data network.

23 Claims, 7 Drawing Sheets

Related U.S. Application Data on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | | |
|---|---|---|---|
| 10,776,316 B2 | 9/2020 | Baggeroer et al. | |
| 10,901,863 B2 | 1/2021 | Lukkoor et al. | |
| 10,922,452 B2 | 2/2021 | Liu et al. | |
| 10,924,527 B2 | 2/2021 | Miller | |
| 11,611,590 B1* | 3/2023 | Amar | G06Q 10/105 |
| 2006/0021045 A1 | 1/2006 | Cook | |
| 2015/0026810 A1 | 1/2015 | Friedrichs et al. | |
| 2018/0041533 A1 | 2/2018 | Chesla | |
| 2018/0121316 A1 | 5/2018 | Ismael et al. | |
| 2018/0357422 A1* | 12/2018 | Telang | G06F 21/577 |
| 2019/0089732 A1* | 3/2019 | Thomas | H04L 9/32 |
| 2019/0297118 A1* | 9/2019 | Haugsnes | H04L 63/1441 |
| 2020/0053109 A1* | 2/2020 | Lancioni | H04L 63/1425 |
| 2020/0143060 A1* | 5/2020 | Tineo | G06F 21/577 |
| 2020/0244412 A1 | 7/2020 | Kalhan | |
| 2020/0244696 A1* | 7/2020 | Thomas | H04L 63/1441 |
| 2020/0252421 A1* | 8/2020 | Pendergast | H04L 63/1433 |
| 2020/0280443 A1 | 9/2020 | Simons | |
| 2020/0342552 A1 | 10/2020 | Sulit et al. | |
| 2020/0380006 A1 | 12/2020 | Rockwell et al. | |
| 2021/0042589 A1 | 2/2021 | Tokarev Sela et al. | |
| 2021/0070333 A1 | 3/2021 | Chen | |
| 2022/0053006 A1* | 2/2022 | O'Hara | H04L 63/1441 |
| 2022/0094705 A1* | 3/2022 | Tineo | H04L 63/1441 |

OTHER PUBLICATIONS

Boutaba, Raouf, et al. "A comprehensive survey on machine learning for networking: evolution, applications and research opportunities." Journal of Internet Services and Applications 9.1 (2018): 1-99.

International Search Report dated Aug. 31, 2022 for PCT 2022/031003.

Anonymous, "Cybersecurity in the Age of the Cloud", Feb. 1, 2020 (Feb. 1, 2020) XP093131485, Retrieved from the Internet: URL:https://www.sans.org/media/cloud-security/eBook_cloud-security.pdf?msc=cloudsecuritylp, on Feb. 14, 2024.

European Extended Search Report dated Feb. 3, 2025, 10 pages.

* cited by examiner

CYBERSECURITY THREAT MANAGEMENT USING ELEMENT MAPPING

RELATED APPLICATIONS

This application claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to cybersecurity threat management using element mapping.

BACKGROUND

Malicious actors of all sorts have launched hostile attacks against computer systems since the dawn of the digital computing era. The computer systems have been the targets of and have been vulnerable to these attacks for a variety of reasons. Common root causes for the hostile attacks include user data theft, industrial espionage, sabotage, retaliation, vindictiveness, and vengeance, among many others. The objectives of the attacks are also varied. The objectives include physically destroying computing hardware by causing the computer systems to overheat or otherwise fail. The objectives further include causing equipment controlled by the computer systems to be disrupted, disconnected, or destroyed; causing enterprise interruption or destruction by encrypting, overwriting, erasing, or corrupting data; or locking out computer systems owners. Some computer system "attacks", referred to as "white hat attacks", are initiated in order to probe the computer systems for vulnerabilities or flaws. Other computer system attacks include cyberwarfare, extortion, theft, and data corruption. These latter attacks are deeply sinister and seek to inflict great harm, to destroy, or even to kill.

The earliest computers were to an extent less vulnerable than today's systems because they were accessible only to authorized users. These users had to be physically present at input and output devices such as card readers and punches, perforated paper tape units, and keyboards and printers such as Teletype™ units. In order to compromise the computer systems, a malefactor had to be physically onsite to load malicious code, or to physically remove data in the form or cards, tapes, or printouts. As computing technology progressed, data could be maliciously obtained by removing magnetic storage media such as cards, tapes, and portable media. However, while limited access provided some computer system security, physical access to the computers was inconvenient to even the authorized users. The users had to travel to the computer system installations to obtain access. The computers were installed in "machine rooms", which were cold, drafty, noisy, and dangerous due to fire suppression technologies. To improve user access, "remote" access to the computers was provided. Users could access computers from any of the terminals distributed around an office, school, or hospital, among other enterprises. Computers too could access each other through hardwired and telephonic connections. Increased access for legitimate users also enabled increased access to bad actors. Physical connections could be tapped, malicious code could be introduced, and data could be collected. Today, with modern computer networking technologies, computers can be accessed from practically any location on earth and beyond. Such access enables authorized users to log into a computer network from the office, coffee shop, or vacation spot. So too, criminals can attempt access from around the globe, without regard to ownership or governmental jurisdiction.

SUMMARY

Successful cybersecurity threat management is critical to the safe and reliable computing operations of enterprises including businesses, universities, hospitals, government agencies, and so on. Enterprises are aware of these threats, and actively pursue best practices to secure their information technology (IT) infrastructure against the threats. While preventive measures are critical to IT operations, the measures alone do not provide universal protection because the cybersecurity threats are constantly evolving and becoming increasingly more sophisticated. As soon as a solution is found for identifying, reacting to, and eradicating a threat such as a virus; thwarting a Trojan horse program; or detecting and deleting a phishing attack; the malefactors behind the threats adapt by using new attack vectors, social engineering ploys, and other deceptions.

Disclosed techniques for cybersecurity management enable cybersecurity threat management using element mapping. A plurality of cybersecurity threat protection applications is accessed, wherein the plurality of cybersecurity threat protection applications includes at least two different data management schemas. The plurality of threat protection applications can include managing applications for one or more of antivirus analysis, phishing attacks, security information and event management (STEM) triage, threat hunting, insider threat protection, threat intelligence, identity verification reinforcement, endpoint protection, forensic investigation, cryptojacking, vulnerability management, cloud security orchestration, and end-to-end incident lifecycle case management. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. The integrating a first mapping and the integrating a second mapping comprises a universal data layer for cybersecurity management. The universal data layer can integrate signals, labels, flags, messages, and so on, generated by the applications or operated upon the applications, into elements of the universal data layer. The integrating includes identifying the signals, messages, etc., used by applications that can use substantially similar threat protection techniques, and mapping them to an element of the universal data layer. The universal data layer enables automation workflows for the data network, where the automation workflows support dynamic swapping of cybersecurity threat protection applications. Cybersecurity is managed for a data network, based on data collected through the first mapping and data transmitted through the second mapping.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
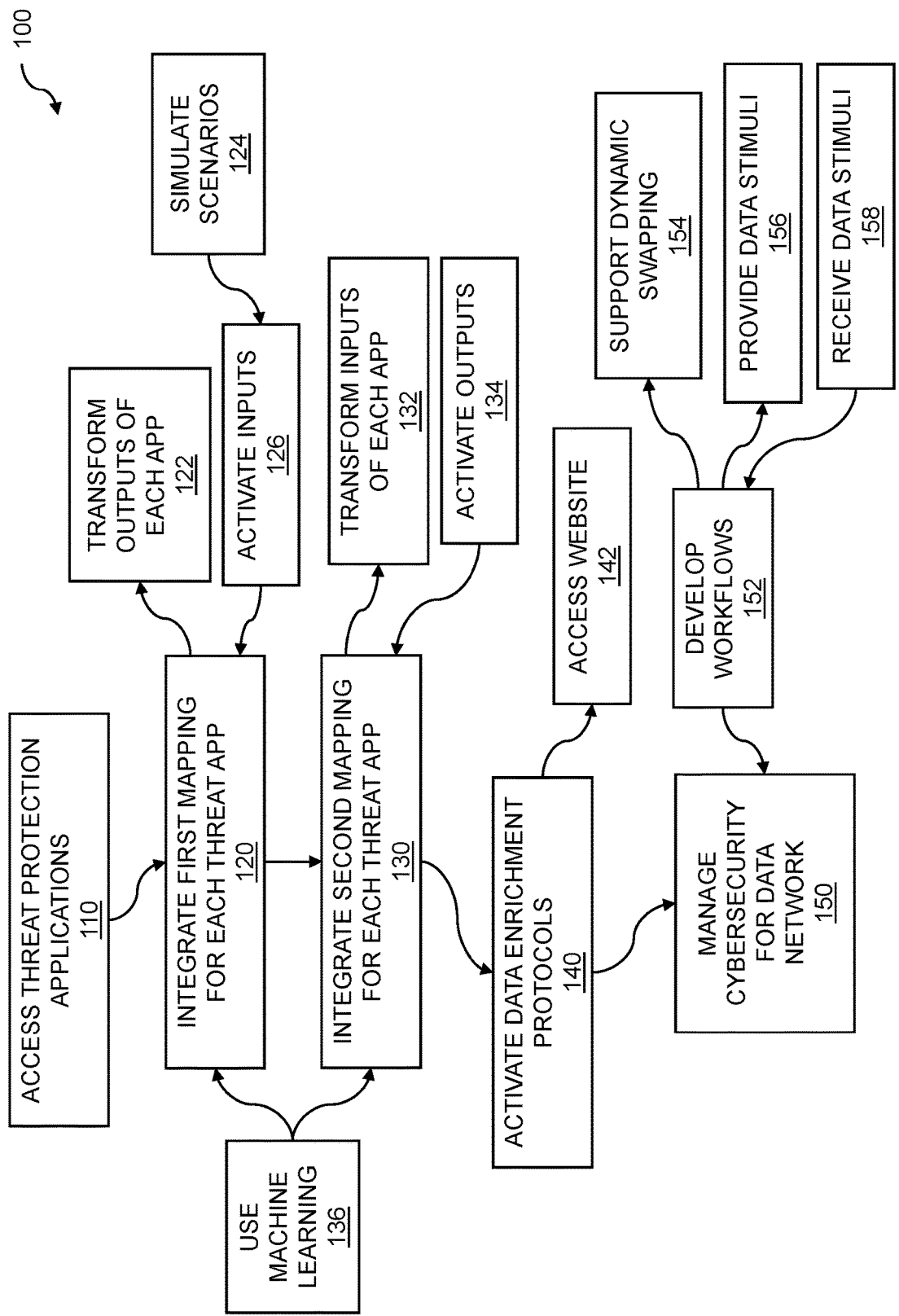
FIG. 1 is a flow diagram for cybersecurity threat management using element mapping.

Cyberattacks against the information technology infrastructures of enterprises such as businesses, retailers, universities, hospitals, research laboratories, and government agencies are a nearly constant occurrence. Cyberattacks have been recorded to occur as often as every few seconds. While enterprises including retail, high technology, and government, the so-called "big three," are by far the most often attacked, small businesses and individuals are also targeted by cybercriminals. The "big three" are attacked because of the value of their data and the capability of large financial payouts. The smaller enterprises and the individuals are targets for quick payouts, if relatively small, and for identity theft. A small enterprise may be willing to pay any amount it can to recover its business data from malefactors who maliciously encrypted the data. An individual may freely and unwittingly provide usernames and passwords to bank or brokerage accounts; and personal information such as telephone numbers, email addresses, physical addresses, age, gender, birthdate, national identification number, and so on; to the cybercriminals, not knowing they are doing so. Some or all of the personal information can be used to open bank accounts, obtain credit cards or loans, and perform other actions which can be ruinous to the individual's financial wellbeing, credit score, etc. The individual may also drain their personal savings and run up personal debt to transfer funds to what turns out to be an offshore financial institution, thinking they are aiding a friend or relative in distress.

Enterprises actively engage in cybersecurity activities to counter cybersecurity threats, and to protect computing systems, data, and other critical information technology (IT) infrastructure. The cybersecurity activities, including cybersecurity threat management, are crucial to securing IT infrastructure, and to ensuring safe and reliable computing operations of the enterprises. Depending on the enterprise, further threat protections such as biometric verification, two-factor authentication, coded challenges and responses, and so on are put in place. The enterprises can be public or private, large or small, and can include businesses, hospitals, government agencies, research facilities, universities, and so on. The enterprises recognize that cybersecurity best practices are critical to the continued operation of, and perhaps the survival of, the enterprises. Cybersecurity is not only a highly complex activity, but also an ever changing one. The cybersecurity measures taken today by the enterprises may thwart known attack techniques, but the techniques used by cybercriminals are constantly changing, specifically to thwart the cybersecurity measures. Nearly as soon as a solution is found for identifying, reacting to, and eradicating a cybersecurity threat such as a virus, a Trojan horse program, or a phishing attack, the cybercriminals adapt their threat techniques. The threat adaptation includes targeting popular electronic devices, using new attack vectors, improving social engineering ploys, and other deceptions. Purported links to naughty photographs of famous people, promises of shared wealth by distressed nobility, and pleas for help from relatives who are in deep trouble while visiting distant locations, are specifically designed by their perpetrators to motivate their victims to react quickly and viscerally. Other ploys include completely copying the landing page of a website with which the victim is familiar. Unless the victim looks at the web address, she or he would be unaware of the deception until their personal information was stolen or their bank accounts are emptied and transferred to an offshore bank.

In disclosed techniques, cybersecurity threat management is accomplished using element mapping. Cybersecurity threat protection applications may perform similar tasks, but the technique names, signals, and messages used to do so can be substantially different. By mapping the applications to a universal data layer, workflows for a data network can be automated. The automated workflows, also called automation workflows, support dynamic swapping of cybersecurity threat protection applications, and enable the applications to be managed. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network based on data collected through the first mapping and data transmitted through the second mapping.

FIG. 1 is a flow diagram for cybersecurity threat management using element mapping. Cybersecurity threat management can be accomplished based on a universal data layer. The universal data layer enables automation workflows for a data network. The automation workflows detect threats and determine best actions to take to address the threats and to neutralize, isolate, or remove the threats. The flow 100 shows a computer-implemented method for cybersecurity management. The flow 100 includes accessing a plurality of cybersecurity threat protection applications 110. The threat protection applications can defend computer systems, data systems, data networks, and so on against various types of malicious attacks. The malicious attacks can include malware attacks, hacking attacks, distributed denial of service attacks, and so on. The applications can include antivirus and anti-phishing applications, tools for threat hunting and threat intelligence, identity verification, endpoint protection, and so on. The plurality of cybersecurity threat protection applications includes at least two different data management schemas. A management schema can be based on a security domain which can contain one or more database objects. Access to the one or more database objects can be controlled by granting access privileges to each user or role, where a role can include a user, a manager, an administrator, and so on.

The flow 100 includes integrating a first mapping of each of the plurality of cybersecurity threat protection applications 120. The plurality of threat protection applications can include two or more applications which can perform substantially similar threat protection techniques. In embodiments, the substantially similar threat protection techniques can include virus detection, Trojan horse detection, insider threat detection, and so on. Although the protection techniques can be substantially similar, signals, flags, messages, indications, and outputs generated by the applications can be different. The integrating the first mapping can include determining common techniques among the disparate outputs. In the flow 100, the first mapping includes a transformation of outputs 122 of each of the plurality of cybersecurity threat protection applications. In a usage example, a first threat protection application and a second threat protection application can perform virus detection. The first application can generate a signal, "security threat detected", while the second application can generate a second signal, "virus detected". The integrating a first mapping can include these two messages and can indicate that the messages convey substantially similar information. Discussed below, the efficacy of threat detection can be simulated. The flow 100 further includes simulating cybersecurity threat scenarios 124. The threat scenarios can include a new or mutated virus, an untested attack vector, and so on. In the flow 100, the simulating cybersecurity threat scenarios is accomplished by activating inputs 126 of the first mapping independently of the plurality of cybersecurity threat protection applications. The simulating can be accomplished virtually and actually. In embodiments, the simulating can virtually activate cybersecurity measures in a simulation mode. The virtual activation can be accomplished by providing test data, synthetic data, etc. to the inputs of the first mapping of applications. The virtual activation can be used for hypothesis testing.

The flow 100 includes integrating a second mapping 130 of each of the plurality of cybersecurity threat protection applications. Similar to the different signal, message, and other outputs discussed previously, the inputs to the applications can reference substantially similar techniques, yet use different names, labels, etc., to do so. In the flow 100, the second mapping includes a transformation 132 of inputs of each of the plurality of cybersecurity threat protection applications. In a usage example, a first threat protection application and a second threat protection application execute a technique based on a detected virus. The first application can receive a signal, "delete threat", while the second application can receive a second signal, "erase virus". The integrating a second mapping can include these two messages and can indicate that the messages convey substantially similar information. In other embodiments, the simulating discussed previously can actually activate cybersecurity measures in the data network. In the flow 100, the actually activating cybersecurity measures in the data network can be accomplished by activating outputs 134 of the second mapping. The actually activating can be used for stress testing, efficiency testing, and the like. In the flow 100, the first mapping and the second mapping are enabled using machine learning 136. The machine learning can use example data from threat detection and response, and can modify workflows to improve the detection and the response.

The flow 100 further includes activating one or more data enrichment protocols 140 for a threat, based on the data stimuli received from at least one of the plurality of cybersecurity threat protection applications. In fact, a data enrichment protocol can be activated based on only a single data stimulus from a single cybersecurity threat protection application. Viruses, Trojan horse programs, phishing attacks, and other forms of cybersecurity threats are constantly evolving. As a result, techniques used for threat detection and response must also progress and adapt. Threat response data can be updated or enriched by consulting in-house experts, learning from previous response successes and failures, and so on. In embodiments, the one or more data enrichment protocols can enable enhanced functionality on at least one enriched application within the plurality of cybersecurity threat protection applications. The enrichment can enable modification or adaptation of the applications. In other embodiments, the one or more data enrichment protocols can enable modification of a typical response for the threat. The modification can include swapping of one or more threat protection applications. At times, an enterprise may need to reach beyond their own security boundaries to learn more about threats and threat responses. In the flow 100, the one or more data enrichment protocols include accessing a website 142. The website can include a secure website, where the secure website can be maintained by an enterprise, a government agency, threat detection experts, and so on. In embodiments, the accessing a website enables additional information gathering for the threat.

The flow 100 includes managing cybersecurity for a data network 150. The managing cybersecurity is based on data collected through the first mapping and data transmitted through the second mapping. The managing cybersecurity can include managing a firewall, threat detection, threat response, and so on. In embodiments, the managing cybersecurity can include managing one or more of antivirus analysis, phishing attacks, security information and event management (STEM) triage, threat hunting, insider threat protection, threat intelligence, identity verification reinforcement, endpoint protection, forensic investigation, cryptojacking, vulnerability management, cloud security orchestration, and end-to-end incident lifecycle case management. The flow 100 further includes developing one or more workflows 152 to control the managing. Discussed throughout, the integrating a first mapping and the integrating a second mapping can include a universal data layer for cybersecurity management, and the universal data layer can enable automation workflows for the data network. The workflows can include executing one or more threat protection applications, processing threat data, orchestrating threat responses, etc. In the flow 100, the automation workflows support dynamic swapping 154 of cybersecurity threat protection applications. The applications can be swapped in or swapped out. The swapping of applications can be used to select an application best suited to responding to a particular threat scenario. Dynamic swapping can be used to enable a new application or a new version of an application without halting or disturbing protection. In the flow 100, the one or more workflows provide data stimuli 156 to at least one of the plurality of cybersecurity threat protection applications, based on the second mapping. The data stimuli can be used to control operation of the application, to adjust operation, and the like. In the flow 100, the one or more workflows receive data stimuli 158 from at least one of the plurality of cybersecurity threat protection applications, based on the first mapping. The received data can be used to determine a threat time, to predict actions to be taken by the threat, to plan a response to the threat, and the like. In embodiments, the received data stimuli and provided data stimuli can include at least two different applications within the plurality of cybersecurity threat protection applications. The data stimuli can be compared to determine efficacy of the applications to detect and respond to a particular threat.

Various embodiments of the flow 100 can be included in a computer program product embodied in a non-transitory computer readable medium that includes code executable by one or more processors.

Figure 2:
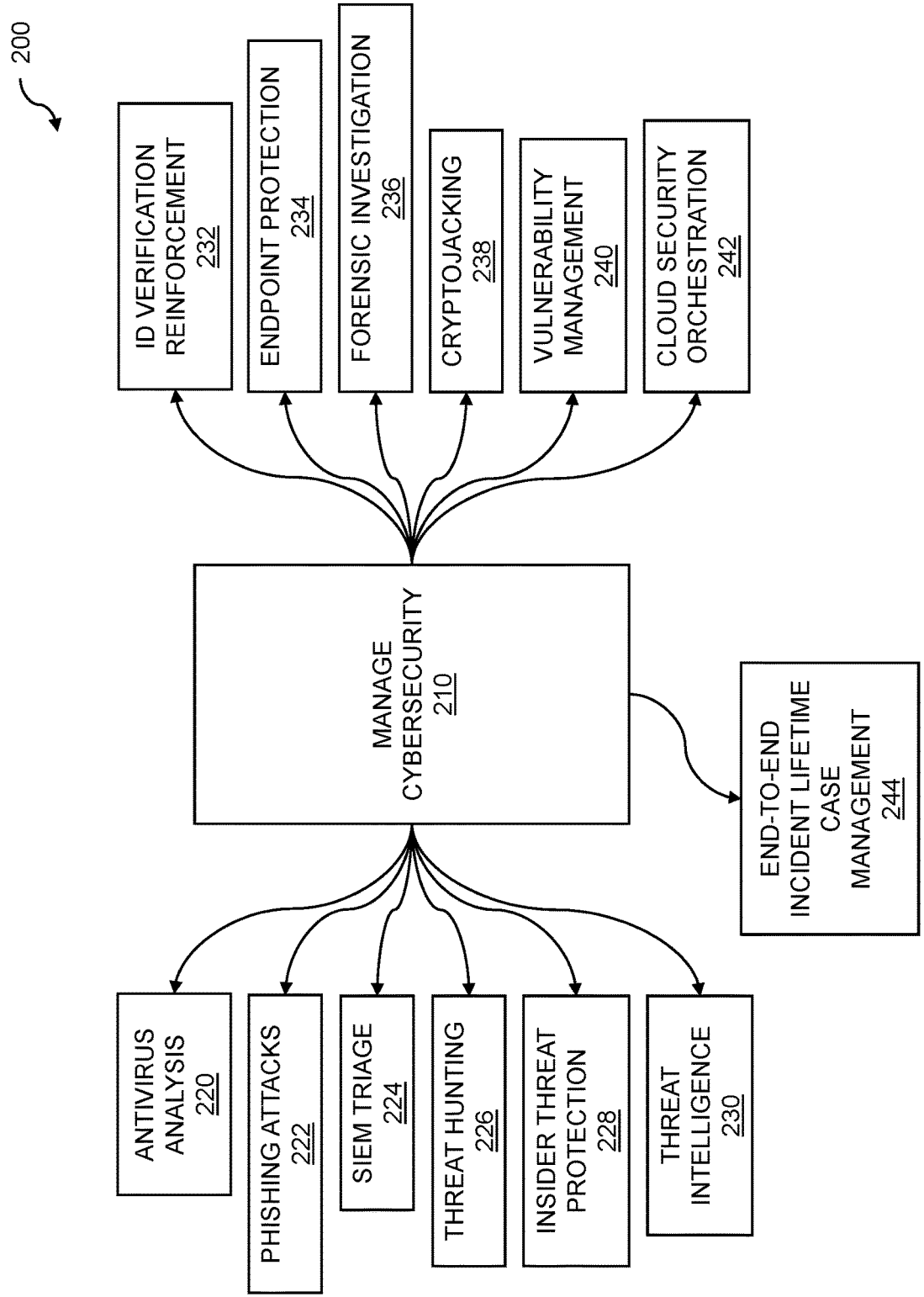
FIG. 2 is a flow diagram for cybersecurity management.

FIG. 2 is a flow diagram for cybersecurity management. Information technology (IT) infrastructure comprises computing devices, storage devices, networks, and so on. Whether these IT elements are operated by an individual for personal use or by an organization in support of operations, the IT elements are susceptible to attack from outside an organization or even from within. Cybersecurity management includes accessing a variety of threat protection applications which can detect an attack, determine the type of attack, determine the origin of an attack, and so on. Further, cybersecurity management provides techniques for addressing issues caused by the attacks by countering the attacks and rectifying the issues caused by the attacks. The various threat protection applications provide elements for detecting, countering, and rectifying cybersecurity threats. The elements associated with the applications can address substantially similar cybersecurity needs. Cybersecurity threat management is accomplished using element mapping. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network, based on data collected through the first mapping and data transmitted through the second mapping.

The flow 200 includes cybersecurity management 210. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on, into a workflow. In other embodiments, the automation workflows can support dynamic swapping of cybersecurity threat protection applications. The workflows can support swapping in or swapping out one or more threat protection applications. The swapping in and the swapping out are enable by a universal data layer (UDL). The UDL enables applications to be swapped without having to edit a workflow or create a new workflow to address the swapped-in application.

The flow 200 includes antivirus analysis 220. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The flow 200 can include analysis of phishing attacks 222. Phishing is a form of attack that attempts to fraudulently obtain personal, sensitive, or private data and information. The data or information that is sought by a phishing attack can include personal information such as name, address, date of birth, telephone numbers, email address, and so on. The information can further include government-related information such as social security number, tax records, military service information etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The flow 200 includes security information and management (SIEM) triage 224. STEM, which combines the management of security information and security events, can provide analysis of security alerts, alarms, warnings, etc., in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The flow 200 includes threat hunting 226. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The flow 200 includes insider threat protection 228. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The flow 200 includes threat intelligence 230. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The flow 200 includes identity verification reinforcement 232. Identity verification can include techniques to verify that a person who has access to computing systems, data systems, networks, and so on, that are associated with an enterprise, is in fact a real person. Identity verification can be based on physical documents such as a government-issued identification documents. The flow 200 can include endpoint protection 234. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device including personal electronic devices must meet certain standards prior to connection to the enterprise network. The standards can include approved devices, operating systems, applications, antivirus applications, virtual private network apps, etc.

The flow 200 includes forensic investigation 236. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The flow 200 includes the detection of cryptojacking 238. Cryptojacking can include hijacking of computers, servers, personal electronic devices and so on for the purposes of mining cryptocurrency. The flow 200 includes vulnerability management 240. Vulnerability management seeks to reduce risks to computing systems, data systems, networks, and so on by identifying, evaluating, correcting, and communicating vulnerabilities associated with the computing systems and the applications that are executed on the computing systems. The flow 200 includes cloud security orchestration 242. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement. The flow 200 includes end-to-end incident lifetime case management 244. An incident can include a virus outbreak, a distributed denial of service (DDOS) attack, and the like. Incident lifetime management can include identifying that an incident has occurred; notifying that the incident has occurred and escalating response to the incident; investigating and diagnosing the incident; and resolving the incident and recovering from the incident. Incident lifetime management can further include closing the incident.

Figure 3:
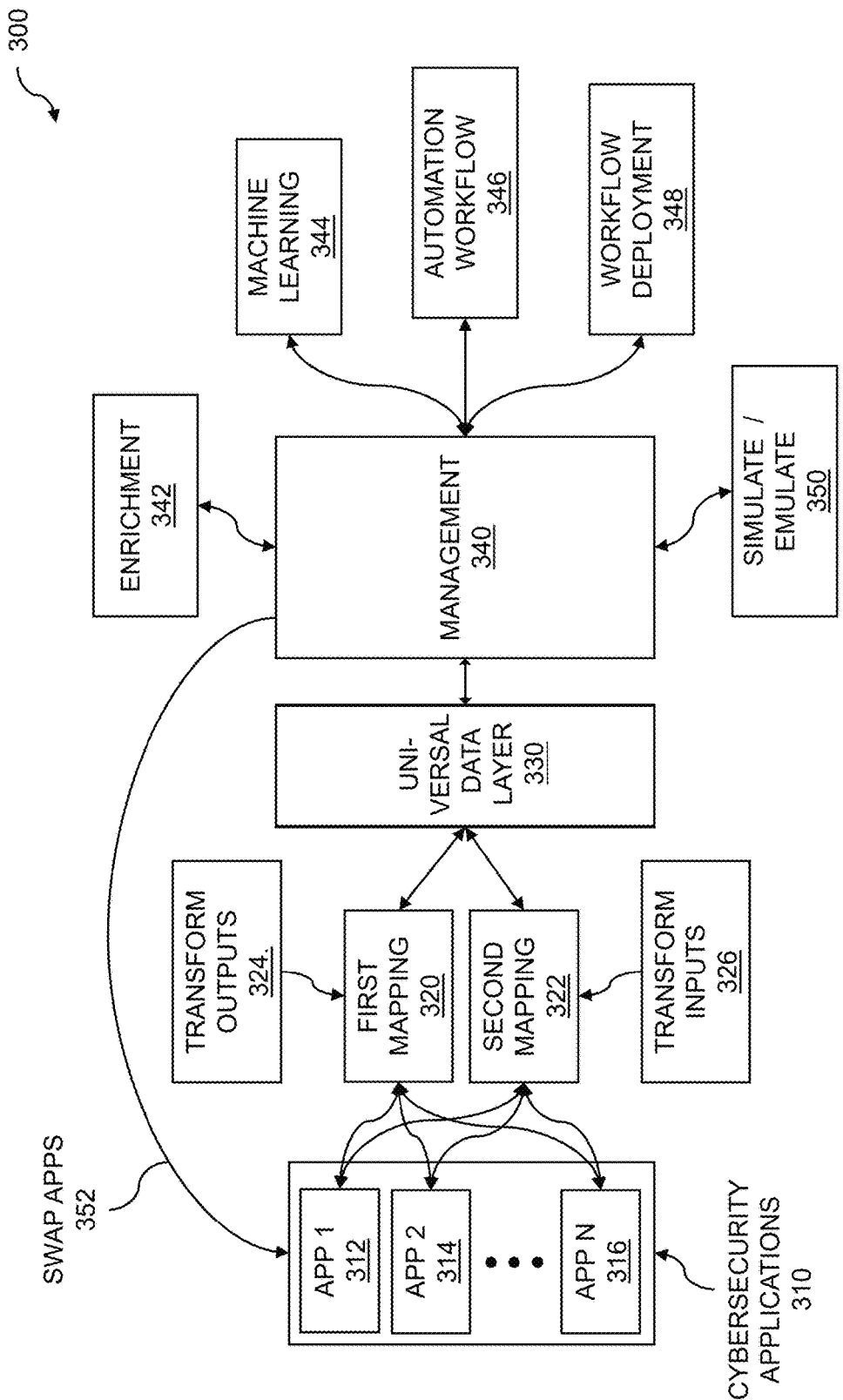
FIG. 3 is a system block diagram for cybersecurity threat management.

FIG. 3 is a system block diagram for cybersecurity threat management. Cybersecurity threats pose extreme risks to data networks associated with individual users, business enterprises, universities, hospitals, government agencies, and so on. Management of a cybersecurity threat can include identifying that a threat exists, determining the type of threat, blocking or removing the threat, and so on. Threat management can be enabled by applying cybersecurity threat protection applications, executing one or more workflows, and the like. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network, based on data collected through the first mapping and data transmitted through the second mapping.

A system block diagram for cybersecurity threat management is shown. The block diagram 300 can include a plurality of cybersecurity applications 310. The plurality of applications can include application 1 312, application 2 314, application N 316, and so on. The applications can include threat protection applications. In embodiments, the threats that can be detected by the applications can include viruses, phishing attacks, cryptojacking, and so on. In further embodiments, the applications can provide further threat assessments such as threat intelligence, security information and event management (STEM) triage, identity verification and enforcement, vulnerability management, threat hunting, endpoint protection, cloud security orchestration, insider threat detection, forensic investigation, end-to-end incident lifecycle management, etc. In the block diagram, each of the applications can be coupled to one or more mappings. In the block diagram, the mappings can include a first mapping 320 and a second mapping 322. Other numbers of mappings can also be included. The first mapping and the second mapping can be based on integrating. In embodiments, a first mapping 320 of each of the plurality of cybersecurity threat protection applications is integrated. The mapping can include mapping common elements associated with applications that can be integrated into a workflow. The common elements can include detecting a threat, identifying a threat, reacting to a threat, and so on. In embodiments, the first mapping includes a transformation of outputs 324 of each of the plurality of cybersecurity threat protection applications. In other embodiments a second mapping 322 of each of the plurality of cybersecurity threat protection applications is integrated. The second mapping can include a transformation of inputs 326 of each of the plurality of cybersecurity threat protection applications. Discussed below and throughout, the transforming of inputs to the applications, and the transforming of the outputs, can be used in the simulation or emulation of threats.

The system block diagram 300 can include a universal data layer (UDL) 330. The UDL can be used to "standardize" data provided to or generated by the cybersecurity threat protection applications. The applications can use different but similar terms to describe or label a threat, an action, a result, and so on. In a usage example, a security threat event such as detection of a virus or Trojan can cause one application to generate a signal such as "security threat detected", while a second application can generate a signal such as "virus detected". Since the different labels are used by the different applications to indicate a substantially similar threat event, the two labels can be standardized. For example, "security threat detected" and "virus detected" can be standardized to "integrity threat" or similar. The system block diagram 300 can include a management block 340. The management block can manage security for one or more computer systems, data systems, networks, and so on. In embodiments, the management block can manage cybersecurity for a data network, based on data collected through the first mapping and data transmitted through the second mapping. Management of a data network, information technology (IT) system, and so on, can include executing one or more workflows. A workflow can access one or more of the plurality of cybersecurity threat detection applications 310, can swap in and swap out applications 352, etc. In embodiments, the managing cybersecurity can include graphical control of the plurality of cybersecurity threat protection applications.

The system block diagram 300 can include data enrichment 342. Data enrichment can include seeking further information about a detected threat, how to address the threat, threat management best practices, and so on. Data enrichment can be accomplished based on one or more protocols. Further embodiments include activating one or more data enrichment protocols for a threat, based on the data stimuli received from at least one of the plurality of cybersecurity threat protection applications. The data enrichment protocols can include accessing a centralized database, seeking expert human intervention, etc. In embodiments, the one or more data enrichment protocols can include accessing a website. The website can include a secure website sited within an organization, provided by a cybersecurity company, etc. In embodiments, the accessing a website enables additional information gathering for the threat. Such information gathering can be particularly useful for addressing newly discovered viruses, Trojans, and the like. The additional information that is gathered can be provided to one or more of the cybersecurity threat detection applications. In embodiments, the one or more data enrichment protocols can enable enhanced functionality on at least one enriched application within the plurality of cybersecurity threat protection applications.

The block diagram 300 can include machine learning 344. The machine learning (ML) can be based on manual learning, autonomous learning, and semi-autonomous learning. ML can be trained based on a training data set, where a training dataset comprises known data such as detected viruses, and expected outcomes such as deleting or quarantining the virus. The block diagram 300 can include automation workflows 346. An automation workflow can be used to describe tasks associated with cybersecurity threat detection, to associate commands with the tasks, and so on. In embodiments, the tasks can include preparation, identification, containment, eradication, recovery, debriefing, etc. In further embodiments, the commands can include endpoint malware alerts, passing a file to an identification phase, analyst review, getting a file, endpoint shutdown, and so on. The block diagram 300 can include workflow deployment 348. Workflows can be developed by a user, can be based on machine learning, and so on. The workflows can be deployed to the management block 340. The block diagram 300 can include simulation and emulation 350. Simulation can include detailed testing computing system, data systems, networks, IT infrastructure, and so on. Simulation can be used to implement system threat management for detection of specific security threats. Emulation can include abstract testing, where the testing can include determining that a threat has been detected without necessarily determining a specific threat or specific information associated with the threat. Further embodiments include simulating cybersecurity threat scenarios by activating inputs of the first mapping independently of the plurality of cybersecurity threat protection applications. The inputs that are activated can be based on workflows that are under development, can be controlled by machine learning or human intervention, etc. The simulating can be based on virtual techniques and actual techniques. In embodiments, the simulating virtually can activate cybersecurity measures in a simulation mode. Cybersecurity measures can be tested prior to deployment on a production computing system. In other embodiments, the simulating actually activates cybersecurity measures in the data network. The actual activation of cybersecurity measures can be used to verify a production system, stress test a production system, etc. In embodiments, the actually activating cybersecurity measures in the data network can be accomplished by activating outputs of the second mapping.

Figure 4:
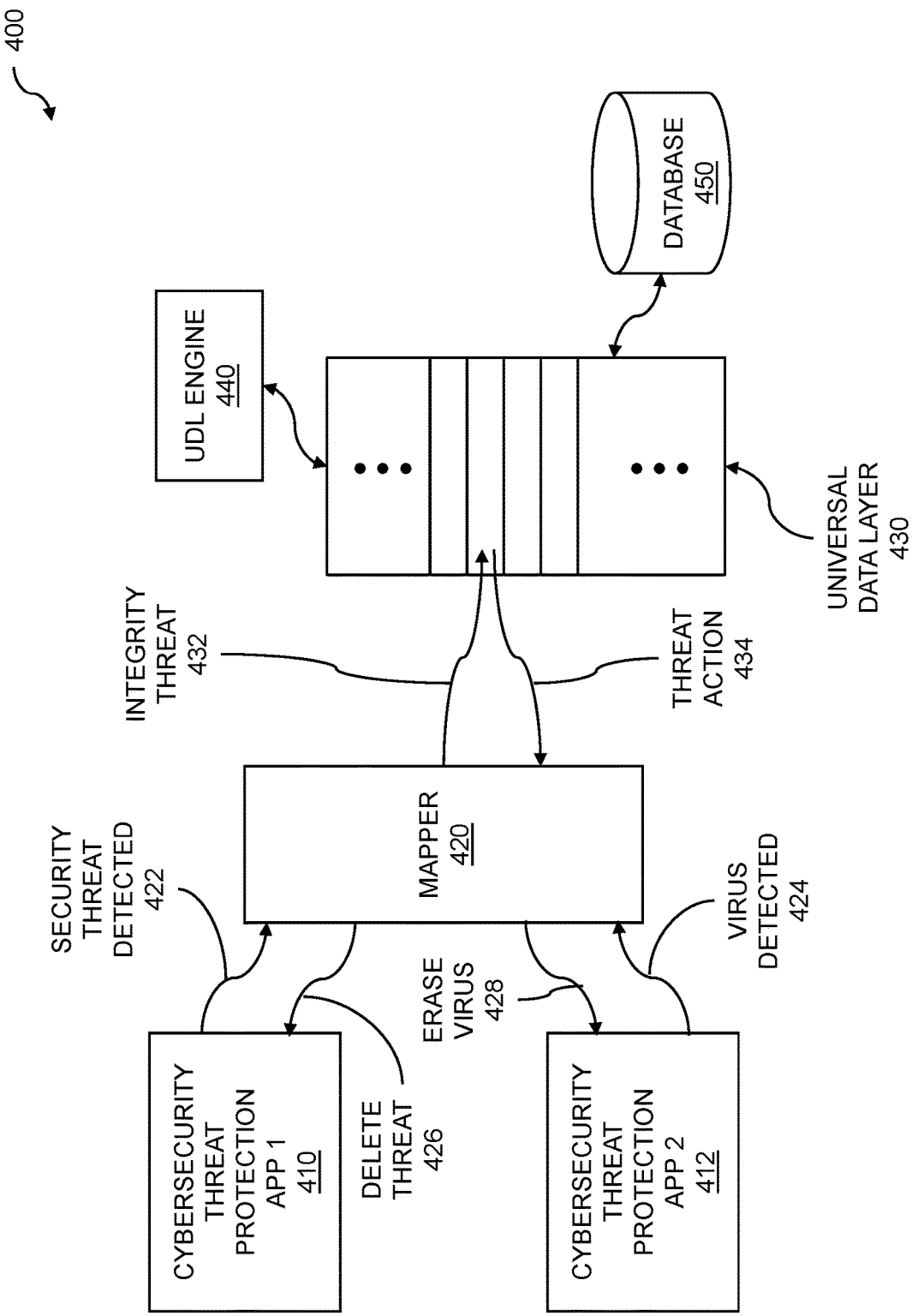
FIG. 4 illustrates mapping to a universal data layer.

FIG. 4 illustrates mapping to a universal data layer. A user, business, school, hospital, government entity, and so on, can select one or more cybersecurity threat protection applications to meet their cybersecurity threat protection requirements. While an individual user may use only a few applications such as antivirus, password protection, and network security and firewall applications, other entities could have tens, hundreds, or more applications at their disposal. Each of the cybersecurity threat protection applications uses its own techniques, signal or alert names, procedures, and so on, to indicate that a cybersecurity threat has been detected. The application can use different labels or names to perform similar operations. In a usage example, one application can execute a technique labeled, "Delete Threat", while a second application can execute a technique labeled, "Erase Virus". Although the techniques can accomplish substantially similar operations, their different labels can present difficulties and complications to a management workflow. By mapping the disparate labels to a universal one, a cybersecurity threat manager can request an operation such as "Eradicate Threat" without requiring detailed knowledge about the specific label associated with a given application. Mapping to a universal data layer enables cybersecurity threat management using element mapping. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network based on data collected through the first mapping and data transmitted through the second mapping.

Mapping from one or more cybersecurity threat protection applications to a universal data layer (UDL) is shown 400. The cybersecurity threat protection applications can include cybersecurity threat protection app 1 410, cybersecurity threat protection app 2 412, and so on. While two applications are shown, other numbers of applications can be mapped to a universal data layer. The applications can include antivirus, firewall, and network protection applications; cyberattack detection applications such as phishing attack, cryptojacking, and insider threat detection; and the like. In embodiments, the applications can perform substantially similar techniques in order to better detect attacks, security flaws or vulnerabilities, etc. The applications can trigger an event, set a flag, send a message or email, and so on, if a threat or potential threat is detected. The applications can be in communication with a mapper 420. The mapper can use various techniques to map a signal, indicator, message, etc. received from the applications to a universal data layer element. The applications can use substantially different indicators for a detected or suspected threat. In the example figure, application 1 can detect a threat and trigger a signal such as "security threat detected" 422. Application 2 can further detect a threat and trigger a signal such as "virus detected" 424. Despite substantially dissimilar terms being used by the applications to indicate that an event such as a virus or other threat has been detected, the semantics of the indications can be substantially similar.

The mapper 420 can map indications of threats, potential threats, and so on to a universal data layer 430. The UDL can include a range of homogenized terms, standard terms, terms of art, and so on. In the example, the indication from application 1, "security threat detected", and the indication from application 2, "virus detected", can be mapped to a common term such as "integrity threat" 432. The use of a URL enables the creation of threat detection macros, workflows, etc., without requiring detailed information about the nuances of a particular threat protection application. Workflows, for example, can be formed based on the terms included in the UDL. In a usage example, a user has a range of threat protection applications at her or his disposal. The user may decide to include an additional application or to replace or swap out one of the applications they are using with another application. Since the workflow is implemented using the common terms supported by the UDL, the workflow does not require updating in order to take advantage of the additional application. Instead, the mapper can be updated with terms particular to the new application. In embodiments, the UDL can be manipulated by a UDL engine 440. The UDL engine can be used to manipulate elements of the UDL, store elements, update elements, and so on. In embodiments, the operations performed by the mapper can be accomplished by the UDL engine. Elements of the UDL can be stored in a database 450. The database can include data associated with workflows, signatures associated with one or more types of cybersecurity threats, and the like. A workflow can indicate that an action should be taken to address the detected threat. A signal such as "threat action" 434 can be issued, where the threat action can include removing the threat, quarantining the threat, and so on. The threat action signal can be mapped from its UDL format to a signal, action, macro, etc. associated with an application. In the example, the "threat action" signal of the UDL can be mapped to "delete threat" 426 and provided to application 1 410, and the UDL signal can be mapped to "erase virus" 428 and provided to application 2 412.

Figure 5:
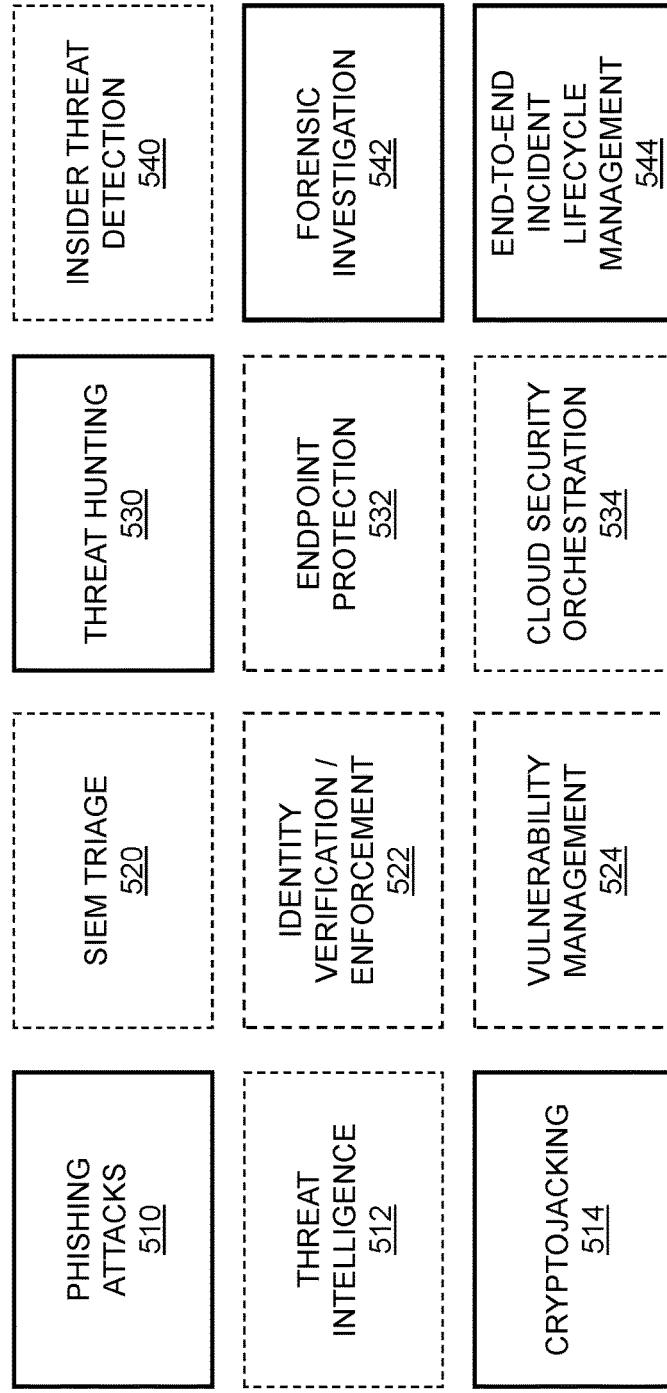
FIG. 5 shows a usage case selection.

FIG. 5 shows a usage case selection. Cybersecurity comprises management of a variety of threats. The threats can include threats targeted at computers, networks, data, corporations, governments, and so on. Cybersecurity threat management can include a variety of objectives such as determining a type of threat, containing the threat, neutralizing the threat, and so on. A user can choose one or more types of threat, threat management techniques, etc., as she or he forms a management plan for their information technology (IT) infrastructure. Usage case selection enables cybersecurity threat management using element mapping. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network, based on data collected through the first mapping and data transmitted through the second mapping.

Cybersecurity threat management usage case selection is shown 500. One or more usage cases can be presented to a user, where the presenting can be rendered on a display associated with a computing device. In the example, twelve usage cases are shown. More or fewer usage cases can be presented, where the presenting can be based on the cybersecurity threat management needs of an organization, an access level of the user, and the like. In a usage example, the access level of the user can include a low level, where the low level enables a user to execute cybersecurity threat management tasks. The level can include a medium level, where a user can select one or more management workflows from a plurality of workflows. The level can include a high level, where a user can create, edit, and delete workflows, direct the application of workflows, perform simulations and emulations of the workflows, etc. In embodiments, the cybersecurity threat management cases that can be selected can include phishing attacks 510, threat intelligence 512, cryptojacking 514 (e.g., stealing cryptocurrency), security information and event management (SIEM) triage 520, identity verification and enforcement 522, vulnerability management 524, threat hunting 530, endpoint protection 532, cloud security orchestration 534, insider threat detection 540, forensic investigation 542, end-to-end incident lifecycle management 544, etc. The user can select usage cases by clicking on one or more of them, selecting the cases from a menu, and so on. In the example 500, a user can select phishing attacks 510, cryptojacking 514, threat hunting 530, forensic investigation 542, and end-to-end incident lifecycle management 544.

Figure 6:
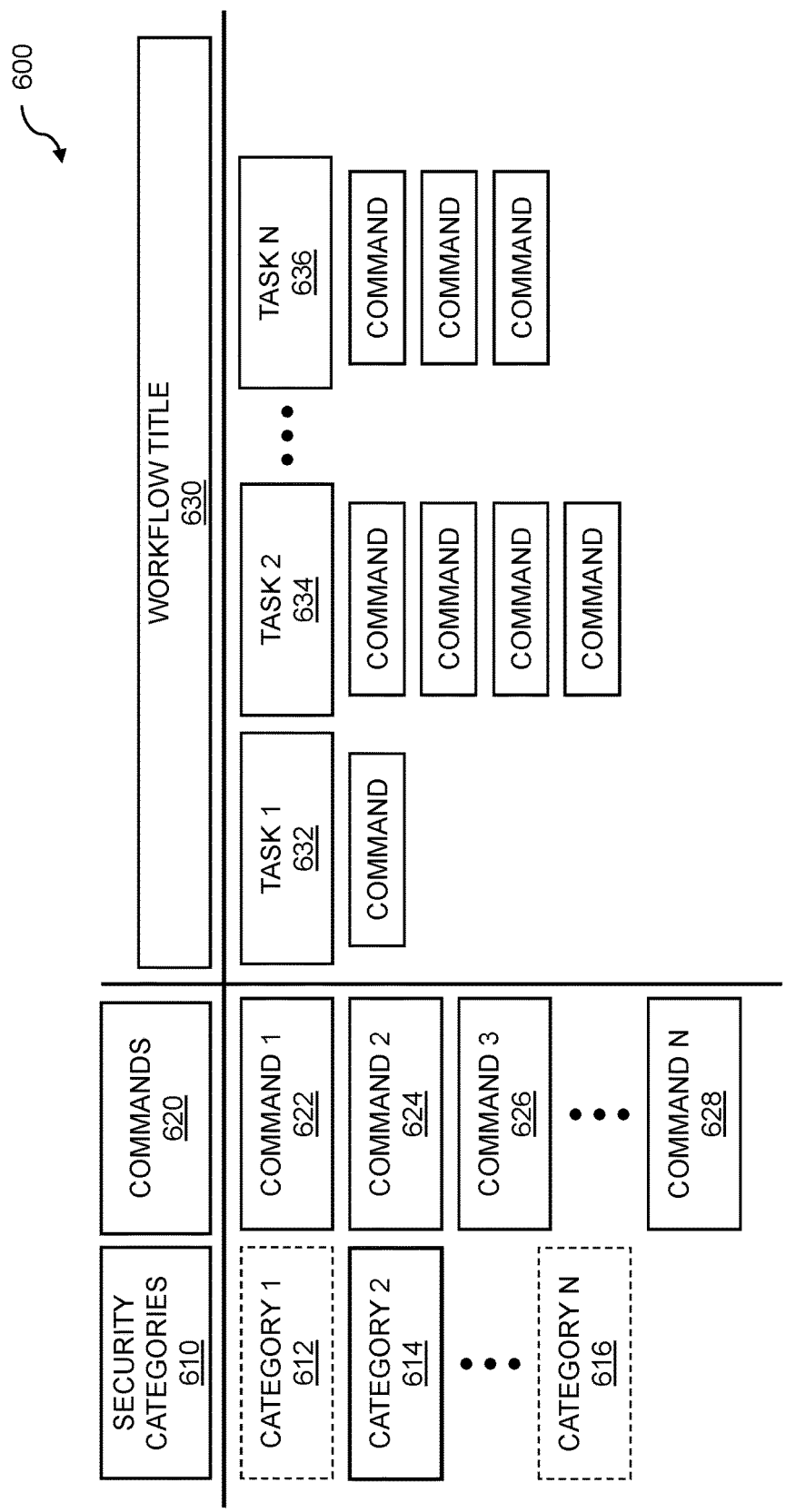
FIG. 6 illustrates workflow creation using a graphical user interface (GUI).

FIG. 6 illustrates workflow creation using a graphical user interface (GUI). Discussed above and throughout, one or more workflows can be developed, where the workflows can be used to control cybersecurity threat management. A given workflow can comprise one or more tasks, where one or more commands can be associated with a task. A graphical user interface, or GUI, can be used to create workflows. The workflows can include cybersecurity categories, management tasks associated with a cybersecurity category, and so on. The GUI can enable creation of a workflow by supporting the dragging and dropping of tasks, commands, and so on, into a workflow. A graphical user interface for workflow creation enables cybersecurity threat management using element mapping. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network based on data collected through the first mapping and data transmitted through the second mapping.

A graphical user interface for workflow creation is illustrated 600. The GUI can be rendered on a screen or display associated with a computing device such as a desktop or laptop computer, a tablet, a server, and so on. The GUI can enable selection of one or more items based on mouse or trackpad clicking, menu selection, and so on. The GUI can display one or more cybersecurity categories 610. In the example shown, the categories can include category 1 612, category 2 614, category N 616, and so on. One or more categories can be selected for workflow creation. In embodiments, the categories can include security information and event management (STEM); user and entity behavior analytics; information technology (IT) service management; password vaulting; threat intelligence platform (TIP); data integration; cyber deception; IT administrative services, and development and operations (DevOps); network performance monitoring and diagnostics; vulnerability management; and the like. The GUI can further include commands 620. The commands can perform file operations, check conditions, etc. In the example, the commands can include command 1 622, command 2 624, command 3 626, and up through command N 628. There can be more commands than categories, fewer commands than categories, and so on. In embodiments, the commands can include endpoint malware alert, pass file hash to identification phase, analyst review, get file, quarantine host, confirm user function request, generate report, endpoint shutdown, security operations center (SOC) alert, close incident, fetch virus total score, and so on.

The workflow includes a workflow title 630. The title can include characters, numbers, special characters, and the like. In addition to the workflow name, the GUI can include radio buttons. In the example, the radio buttons can include workflow details under which a user can add, edit, and delete tasks, commands, and the like. Other radio buttons can include "trash" to delete a workflow, "run" to execute a workflow, "preview" to simulate a workflow, etc. A user can use the GUI to set up tasks. In the example, the tasks can include task 1 632, task 2 634, task N 636, etc. The tasks associated with the workflow can be tasks chosen by the user, tasks based on a security management template, and the like. In embodiments, the tasks can include preparation, certification, containment, eradication, recovery, outputs and/or debrief, etc. The user can drag and drop commands to the various tasks associated with the workflow. Commands can be included in a task, omitted, repeated, and so on.

Figure 7:
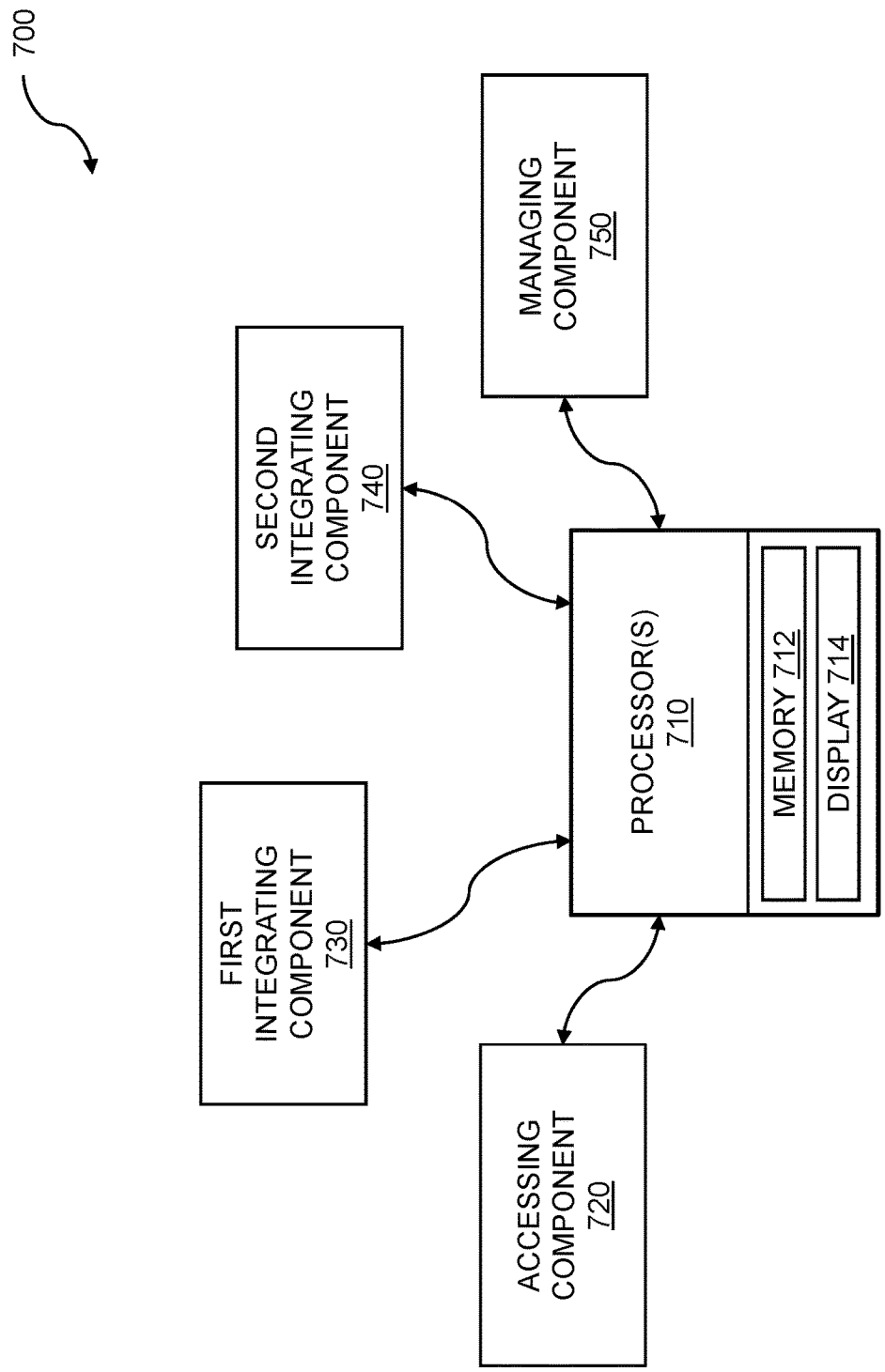
FIG. 7 is a system diagram for cybersecurity threat management using element mapping.

FIG. 7 is a system diagram for cybersecurity threat management using element mapping. Detecting and counteracting cybersecurity threats are critical to secure computing operations such as data transfers, data manipulations, and so on. The cybersecurity threats can be based on social engineering techniques such as phishing, ransomware, distributed denial of service (DDoS) attacks, third-party software hacks, cloud computing and storage vulnerabilities, and the like. Element mapping techniques can be used to determine that a cybersecurity threat exists, and to remove, neutralize, or counter the threat. Element mapping enables cybersecurity mapping. A plurality of cybersecurity threat protection applications is accessed, wherein the plurality of cybersecurity threat protection applications includes at least two different data management schemas. A first mapping of each of the plurality of cybersecurity threat protection applications is integrated, wherein the first mapping includes a transformation of outputs of each of the plurality of cybersecurity threat protection applications. A second mapping of each of the plurality of cybersecurity threat protection applications is integrated, wherein the second mapping includes a transformation of inputs of each of the plurality of cybersecurity threat protection applications. Cybersecurity is managed for a data network, based on data collected through the first mapping and data transmitted through the second mapping.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more cybersecurity applications, integrated mappings, information associated with one or more data networks, and the like. Information associated with cybersecurity threat management using element mapping can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can include an accessing component 720. The accessing component 720 can be used for accessing a plurality of cybersecurity threat protection applications. The applications can include applications for threat detection and response management, web security, antivirus, dark web monitoring, security testing, and so on. The plurality of cybersecurity threat protection applications includes at least two different data management schemas. A data management schema can include an organization of management techniques associated with data such as storing data, controlling access to data (e.g., access control list or ACL), and so on. The system 700 includes a first integrating component 730. The first integrating component 730 is configured to integrate a first mapping of each of the plurality of cybersecurity threat protection applications, wherein the first mapping includes a transformation of outputs of each of the plurality of cybersecurity threat protection applications. The outputs of the applications can include signals, actions, techniques, and so on. The outputs of two or more applications can perform substantially similar actions or apply substantially similar techniques. The substantially similar actions, signals, techniques, etc., can be named or labeled differently. In a usage example, a first application for virus detection may indicate "Virus Detected", while a second application, also for virus detection, may indicate "Threat Found". In embodiments, the integrating a first mapping can include a universal data layer for cybersecurity management. The universal data layer can use a common or shared indication that a problem has been found. In further embodiments, the universal data layer can enable automation workflows for the data network. The automation workflows can include techniques for managing detected cybersecurity threats.

The system 700 can include a second integrating component 740. The second integrating component 740 can integrate a second mapping of each of the plurality of cybersecurity threat protection applications, wherein the second mapping includes a transformation of inputs of each of the plurality of cybersecurity threat protection applications. In embodiments, the integrating a second mapping can include a universal data layer for cybersecurity management. Discussed above and throughout, the universal data layer can enable automation workflows for the data network. The workflows can be used for selecting one or more applications from the plurality of applications, operating the applications, and so on. In embodiments, the automation workflows can support dynamic swapping of cybersecurity threat protection applications. Applications can be swapped in or out depending on detection of a threat, determination of a type of threat, and so on. In embodiments, the universal data layer enables additional cybersecurity threat protection applications to be managed for the data network. The management of the threat protection can be accomplished by coding "macros", configuring the applications, and so on. In embodiments, the managing cybersecurity can include graphical control of the plurality of cybersecurity threat protection applications. Applications, commands, techniques, and so on, can be dragged and dropped into a workflow. In embodiments, the first mapping and the second mapping are enabled using machine learning. The machine learning can be based on "learning" from previous threats.

The system 700 can include a managing component 750. The managing component 750 can manage cybersecurity for a data network based on data collected through the first mapping and data transmitted through the second mapping. The managing can include managing individual devices coupled to a data network, regions of a data network, and so on. The managing can include one or more tasks, procedures, techniques, etc., associated with cybersecurity. In embodiments, the managing cybersecurity can include managing one or more of antivirus analysis, phishing attacks, security information and event management (STEM) triage, threat hunting, insider threat protection, threat intelligence, identity verification reinforcement, endpoint protection, forensic investigation, cryptojacking, vulnerability management, cloud security orchestration, and end-to-end incident lifecycle case management. The managing can include simulating or emulating cybersecurity threats. Embodiments further include simulating cybersecurity threat scenarios by activating inputs of the first mapping independently of the plurality of cybersecurity threat protection applications. The simulation can be based on virtual activation, actual activation, and so on. In embodiments, the virtual simulation activates cybersecurity measures in a simulation mode. One or more devices coupled to a data network can be taken offline, placed in a "security playpen", etc. In other embodiments, the simulating actually activates cybersecurity measures in the data network. The actually activating cybersecurity measures in the data network can be accomplished using a variety of techniques such as by activating outputs of the second mapping. Further embodiments include activating one or more data enrichment protocols for a threat, based on the data stimuli received from at least one of the plurality of cybersecurity threat protection applications. The data enrichment can be accomplished by enabling additional features of a cybersecurity threat application, activating additional applications, etc. In embodiments, the one or more data enrichment protocols can include accessing a website. The website can include a secure website. In embodiments, the accessing a website can enable additional information gathering for the threat.

Disclosed embodiments include a computer program product embodied in a non-transitory computer readable medium for cybersecurity management, the computer program product comprising code which causes one or more processors to perform operations of: accessing a plurality of cybersecurity threat protection applications, wherein the plurality of cybersecurity threat protection applications includes at least two different data management schemas; integrating a first mapping of each of the plurality of cybersecurity threat protection applications, wherein the first mapping includes a transformation of outputs of each of the plurality of cybersecurity threat protection applications; integrating a second mapping of each of the plurality of cybersecurity threat protection applications, wherein the second mapping includes a transformation of inputs of each of the plurality of cybersecurity threat protection applications; and managing cybersecurity for a data network, based on data collected through the first mapping and data transmitted through the second mapping.

Disclosed embodiments include a computer system for cybersecurity comprising: a memory which stores instructions; one or more processors coupled to the memory wherein the one or more processors, when executing the instructions which are stored, are configured to: access a plurality of cybersecurity threat protection applications, wherein the plurality of cybersecurity threat protection applications includes at least two different data management schemas; integrate a first mapping of each of the plurality of cybersecurity threat protection applications, wherein the first mapping includes a transformation of outputs of each of the plurality of cybersecurity threat protection applications; integrate a second mapping of each of the plurality of cybersecurity threat protection applications, wherein the second mapping includes a transformation of inputs of each of the plurality of cybersecurity threat protection applications; and manage cybersecurity for a data network, based on data collected through the first mapping and data transmitted through the second mapping.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:
    accessing a plurality of cybersecurity threat protection applications, wherein the plurality of cybersecurity threat protection applications includes at least two different data management schemas;
    integrating a first mapping of each of the plurality of cybersecurity threat protection applications, wherein the first mapping includes a transformation of outputs of each of the plurality of cybersecurity threat protection applications;
    integrating a second mapping of each of the plurality of cybersecurity threat protection applications, wherein the second mapping includes a transformation of inputs of each of the plurality of cybersecurity threat protection applications;
    dynamically swapping in, based on initially detecting a cryptojacking event in a data network, a cryptojacking cybersecurity threat protection application amongst the plurality of cybersecurity threat protection applications to enable the cryptojacking cybersecurity threat protection application to detect and respond to cryptojacking events without halting or disrupting current cybersecurity protections for the data network;
    based on the swapping in of the cryptojacking cybersecurity threat protection application, updating the first mapping and second mapping with terms particular to the cryptojacking cybersecurity threat protection application, wherein the first mapping and second mapping map to a universal data layer; and
    managing the current cybersecurity protections for the data network to detect and respond to the cryptojacking events in the data network, based on data collected through the first mapping and data transmitted through the second mapping.

2. The method of claim 1 wherein the integrating a first mapping and the integrating a second mapping comprises the universal data layer for cybersecurity management.

3. The method of claim 2 wherein the universal data layer enables automation workflows for the data network.

4. The method of claim 2 wherein the universal data layer enables additional cybersecurity threat protection applications to be managed for the data network.

5. The method of claim 1 wherein the managing cybersecurity includes graphical control of the plurality of cybersecurity threat protection applications.

6. The method of claim 1 further comprising developing one or more workflows to control the managing.

7. The method of claim 6 wherein the one or more workflows provide data stimuli to at least one of the plurality of cybersecurity threat protection applications, based on the second mapping.

8. The method of claim 7 wherein the one or more workflows receive data stimuli from at least one of the plurality of cybersecurity threat protection applications, based on the first mapping.

9. The method of claim 8 wherein the received data stimuli and provided data stimuli include at least two different applications within the plurality of cybersecurity threat protection applications.

10. The method of claim 1 further comprising activating one or more data enrichment protocols for a threat, based on data stimuli received from at least one of the plurality of cybersecurity threat protection applications.

11. The method of claim 10 wherein the one or more data enrichment protocols include accessing a website.

12. The method of claim 10 wherein the one or more data enrichment protocols enable enhanced functionality on at least one enriched application within the plurality of cybersecurity threat protection applications.

13. The method of claim 10 wherein the one or more data enrichment protocols enable modification of a typical response for the threat.

14. The method of claim 1 further comprising simulating cybersecurity threat scenarios by activating inputs of the first mapping independently of the plurality of cybersecurity threat protection applications.

15. The method of claim 14 wherein the simulating virtually activates cybersecurity measures in a simulation mode.

16. The method of claim 14 wherein the simulating actually activates cybersecurity measures in the data network.

17. The method of claim 16 wherein the actually activating cybersecurity measures in the data network is accomplished by activating outputs of the second mapping.

18. The method of claim 1 wherein the managing the current cybersecurity protections further includes managing one or more of antivirus analysis, phishing attacks, security information and event management (SIEM) triage, threat hunting, insider threat protection, threat intelligence, identity verification reinforcement, endpoint protection, forensic investigation, vulnerability management, cloud security orchestration, and end-to-end incident lifecycle case management.

19. The method of claim 1 wherein the first mapping and the second mapping are enabled using machine learning.

20. A computer program product embodied in a non-transitory computer readable medium for cybersecurity management, the computer program product comprising code which causes one or more processors to perform operations of:
accessing a plurality of cybersecurity threat protection applications, wherein the plurality of cybersecurity threat protection applications includes at least two different data management schemas;
integrating a first mapping of each of the plurality of cybersecurity threat protection applications, wherein the first mapping includes a transformation of outputs of each of the plurality of cybersecurity threat protection applications;
integrating a second mapping of each of the plurality of cybersecurity threat protection applications, wherein the second mapping includes a transformation of inputs of each of the plurality of cybersecurity threat protection applications;
dynamically swapping in, based on initially detecting a cryptojacking event in a data network, a cryptojacking cybersecurity threat protection application amongst the plurality of cybersecurity threat protection applications to enable the cryptojacking cybersecurity threat protection application to detect and respond to cryptojacking events without halting or disrupting current cybersecurity protections for the data network;
based on the swapping in of the cryptojacking cybersecurity threat protection application, updating the first mapping and second mapping with terms particular to the new cybersecurity threat protection application, wherein the first mapping and second mapping map to a universal data layer; and
managing the current cybersecurity protections for the data network to detect and respond to the cryptojacking events in the data network, based on data collected through the first mapping and data transmitted through the second mapping.

21. The computer program product of claim 20, wherein the universal data layer enables automation workflows for the data network.

22. A computer system for cybersecurity comprising:
a memory which stores instructions;
one or more processors coupled to the memory wherein the one or more processors, when executing the instructions which are stored, are configured to:
access a plurality of cybersecurity threat protection applications, wherein the plurality of cybersecurity threat protection applications includes at least two different data management schemas;
integrate a first mapping of each of the plurality of cybersecurity threat protection applications, wherein the first mapping includes a transformation of outputs of each of the plurality of cybersecurity threat protection applications;
integrate a second mapping of each of the plurality of cybersecurity threat protection applications, wherein the second mapping includes a transformation of inputs of each of the plurality of cybersecurity threat protection applications;
dynamically swapping in, based on initially detecting a cryptojacking event in a data network, a cryptojacking cybersecurity threat protection application amongst the plurality of cybersecurity threat protection applications to enable the cryptojacking cybersecurity threat protection application to detect and respond to cryptojacking events without halting or disrupting current cybersecurity protections for the data network;
based on the swapping in of the cryptojacking cybersecurity threat protection application, updating the first mapping and second mapping with terms particular to the cryptojacking cybersecurity threat protection application, wherein the first mapping and second mapping map to a universal data layer; and
manage the current cybersecurity protections for the data network to detect and respond to the cryptojacking events in the data network, based on data collected through the first mapping and data transmitted through the second mapping.

23. The computer system of claim 22, wherein the universal data layer enables automation workflows for the data network.

* * * * *